United States Patent [19]
Hughes et al.

[11] 3,962,014
[45] June 8, 1976

[54] THERMAL INSULATING MATERIALS

[75] Inventors: John Thomas Hughes, Mamble near Kidderminster; Joseph Anthony MacWilliams, Kidderminster, both of England

[73] Assignee: Micropore Insulation Limited, Worcester, England

[22] Filed: June 10, 1971

[21] Appl. No.: 151,970

[30] Foreign Application Priority Data
June 10, 1970 United Kingdom............... 28052/70

[52] U.S. Cl................................. 156/276; 156/85; 156/87; 156/306; 264/45.1; 428/76
[51] Int. Cl.² ........................................ B32B 31/00
[58] Field of Search ............... 264/45.1; 156/85, 87, 156/306, 276; 428/76

[56] References Cited
UNITED STATES PATENTS

| | | | |
|---|---|---|---|
| 2,989,783 | 6/1961 | Slapnik | 264/45 |
| 3,395,066 | 7/1968 | Tucker | 156/85 |
| 3,573,148 | 3/1971 | Habgood, Jr. et al. | 264/112 |

Primary Examiner—William J. Van Balen
Attorney, Agent, or Firm—Holman & Stern

[57] ABSTRACT

A method of making a thermal insulating panel in which particles of microporous insulating material are put into a bag consisting of porous sheet material which is then subject to pressure to cause the particles to bond together and consolidate the insulating material and to create a tension strain in the material of the bag.

4 Claims, No Drawings

THERMAL INSULATING MATERIALS

BACKGROUND OF THE INVENTION

1. Field of the Invention

This invention relates to thermal insulating materials.

2. Description of the Prior Art

Panels of thermal insulation material are known which consist of kieselguhr moulded to the required configuration. Microporous insulation materials are also known, these normally being used as a loose unconsolidated mass. Swiss Specification No. 8,024 discloses the manufacture of panels of insulation material from kieselguhr and German Patent Specification No. 1,170,855 discloses the use of a loose consolidated mass of microporous silica aerogel as a thermal insulator.

SUMMARY OF THE INVENTION

A method of making a panel of thermal insulating material comprising placing in a bag consisting of porous sheet material, particles of microporous thermal insulating material, sealing the bag to form a complete enclosure for the material, and applying pressure to the exterior of the bag to cause the particles to bond together and consolidate the insulating material and to create a tension strain in the material of the bag.

DESCRIPTION OF A PREFERRED EMBODIMENT

In one example of the present invention a microporous thermal insulating material is prepared by admixing microporous silica aerogel and titanium oxide as an opacifier. The amount of opacifier is preferably about one tenth to twice the weight of the silica aerogel. A fibrous material can also be included in the mix, for example, if the insulating material is to be used at elevated temperatures, ceramic fibers can be used. For lower temperatures applications, other fibrous materials can be used. Other microporous particulate materials which can be used instead of silica aerogel include finely divided microporous metal oxides such as alumina, zirconia and titania of similar particle size and structure as silica aerogel.

When an intimate mixture of silica aerogel or other microporous particulate material, opacifier and optionally the ceramic or other fibers has been prepared, the insulating material is placed in a porous envelope in the form of a bag of glass fiber cloth of low permeability.

To fill the bag with the insulating material, the bag is attached to a discharge nozzle at the end of a feed pipe for the insulating material. The bag is contained within a chamber connected to a suction device and the pressure within the chamber is reduced to obtain an induced feed of the insulating material into the bag. When sufficient insulating material has been fed into the bag, the application of suction is discontinued, the bag is removed from the discharge nozzle and the open mouth of the bag is closed as by sewing or by application of a resinous sealant.

The bag containing the insulating material is then placed on the bottom die of a press and the upper die of the press is then lowered whereby the bag of insulating material is formed into a semi-rigid panel. The two dies of the press are so formed as to permit the escape of air through the pores of the bag. There is a build-up of reaction forces within the microporous insulating material which creats a tension strain in the glass fiber. On application of the pressure to the bag of insulating material which causes air to escape from the bag through the pores of the glass fiber cloth, the particles of microporous silica aerogel become bonded to each other and the glass fiber bag, at least part of the bonding between the bag and the particles of silica aerogel resulting from penetration of the pores of the glass fiber bag by the silica aerogel particles. The silica aerogel particles thus become effectively mechanically interlocked with the material forming the envelope.

The tension strain created within the glass fiber cloth remains after release of the applied pressure and this induced tension strain provides additional rigidity for the insulating panel structure.

If the glass fiber cloth is composed of a smooth yarn, the yarn is preferably pre-treated by deposits thereon of a ceramic oxide or a chemical "starch" to increase the degree of bonding between the yarn and the insulating material.

Although the invention has been described above in relation to an envelope formed of glass fiber cloth, the porous envelope can alternatively be formed of paper having the requred permeability or of a synthetic plastics material, again having the required permeability.

The porous envelope can also be formed of cotton, the use of a cotton envelope resulting in a flexible structure which can be shaped to fit contoured surfaces.

One important application of a panel constructed in accordance with the present invention is in thermal storage heaters in which, because of the high insulating efficiency of the insulating panel, the thickness of the panel which is used can be substantially reduced as compared with previous insulating panels so that the size of the cabinet or like structure of the storage heater can be reduced giving a considerable saving in size and materials.

The particles of insulating material are preferably bonded to the envelope by penetration of the pores thereof and it is preferred that the envelope is in tension. The envelope does not need to be porous throughout the whole area thereof so long as provision is made for the escape of air or gas to allow compaction of the particulate material.

The preferred particulate insulating material is microporous silica aerogel intimately mixed with an opacifier such as titanium dioxide, chromium oxide, zirconium oxide, iron oxide, manganese dioxide or carbon black.

Microporous silica aerogel is a gel in which the liquid phase has been replaced by a gaseous phase in such a way as to avoid the shrinkage which would occur if the gel had been dried directly from a liquid. A substantially identical structure can, however, be obtained by controlled precipitation from a silica solution, the temperature and p.H. being controlled during precipitation to obtain an open lattice precipitate.

The term microporous silica aerogel as used in this specification is to be deemed to include not only microporous silica aerogel as described above but also equivalent microporous open lattice silica structures, such as precipitated, pyrogenic or electro-thermal types in which the average ultimate particle size is less than 100 milli-micro-meters.

We claim:

1. A method of making a panel of thermal insulating material comprising, placing dry particulate microporous thermal insulating material having an average particle size less than 100 milli-micro-meters in a bag consisting of porous sheet material, sealing the bag to form a complete enclosure for the insulating material, and applying pressure to the exterior of the bag to thereby cause the particles to bond together and consolidate the insulating material, to cause particles of the insulating material to penetrate into the pores of the material of the bag and bond the insulating material to the bag, and to create a tension strain in the material of the bag.

2. A method according to claim 1 wherein the insulating material is selected from the group consisting of microporous silica aerogel, alumina, zirconia and titania and the material of the bag is selected from the group consisting of glass fiber cloth, paper, cotton and porous synthetic plastic.

3. A method as claimed in claim 1 wherein the material of the bag is glass fiber cloth.

4. A method according to claim 1 wherein the insulating material consists essentially of microporous silica aerogel and an opacifier.

* * * * *